US012749222B2

(12) United States Patent
Chen

(10) Patent No.: US 12,749,222 B2
(45) Date of Patent: Sep. 29, 2026

(54) KIT DEVICE, CALIBRATION SYSTEM AND OPERATION METHOD THEREOF

(71) Applicant: LITE-ON TECHNOLOGY CORPORATION, Taipei City (TW)

(72) Inventor: Yen-Chun Chen, Taipei City (TW)

(73) Assignee: LITE-ON TECHNOLOGY CORPORATION, Taipei City (TW)

( * ) Notice: Subject to any disclaimer, the term of this patent is extended or adjusted under 35 U.S.C. 154(b) by 0 days.

(21) Appl. No.: 18/983,696

(22) Filed: Dec. 17, 2024

(65) Prior Publication Data

US 2025/0336093 A1 Oct. 30, 2025

Related U.S. Application Data

(60) Provisional application No. 63/637,915, filed on Apr. 24, 2024.

(30) Foreign Application Priority Data

Oct. 15, 2024 (TW) ................................ 113139124

(51) Int. Cl.

| | |
|---|---|
| ***G06T 7/80*** | (2017.01) |
| ***H04N 17/00*** | (2006.01) |
| ***H04N 23/698*** | (2023.01) |
| ***H04N 23/90*** | (2023.01) |

(52) U.S. Cl.

CPC ............. *G06T 7/80* (2017.01); *H04N 17/002* (2013.01); *H04N 23/698* (2023.01); *H04N 23/90* (2023.01); *G06T 2207/30252* (2013.01); *G06T 2207/30268* (2013.01)

(58) Field of Classification Search

CPC ... G06T 7/80; G06T 7/85; G06T 2207/30252; G06T 2207/30268; H04N 17/002; H04N 23/90; H04N 23/698

See application file for complete search history.

(56) References Cited

U.S. PATENT DOCUMENTS

| | | | | |
|---|---|---|---|---|
| 6,593,960 | B1 * | 7/2003 | Sugimoto | B60R 11/04 348/148 |
| 8,059,887 | B2 * | 11/2011 | Fields | G06T 7/596 382/141 |
| 9,386,302 | B2 * | 7/2016 | Zeng | G06T 7/80 |
| 9,723,272 | B2 * | 8/2017 | Lu | G06T 7/33 |
| 9,834,153 | B2 * | 12/2017 | Gupta | G06T 7/85 |
| 9,965,870 | B2 * | 5/2018 | Claveau | H04N 17/002 |

(Continued)

*Primary Examiner* — Brian P Yenke

(74) *Attorney, Agent, or Firm* — McClure, Qualey & Rodack, LLP

(57) ABSTRACT

A calibration system is provided. The first camera has a first field of view. The second camera has a second field of view. The third camera has a third field of view. The third field of view overlaps the first and second fields of view. The first calibration board is disposed within the first and third fields of view. The second calibration board is disposed within the second and third fields of view. The first camera captures the first calibration board to generate a first image. The second camera captures the second calibration board to generate a second image. The third camera captures the first calibration board and the second calibration board to generate a third image. The processing unit calculates the relative position and the angle difference of the first camera and the second camera according to the first image, the second image and the third image.

15 Claims, 8 Drawing Sheets

(56) References Cited

U.S. PATENT DOCUMENTS

| | | | | |
|---|---|---|---|---|
| 9,978,146 | B2 * | 5/2018 | Hedi | G06T 7/80 |
| 10,366,512 | B2 * | 7/2019 | Jeong | G06T 7/74 |
| 10,657,391 | B2 * | 5/2020 | Chen | G06V 20/588 |
| 10,911,745 | B2 * | 2/2021 | Shivalingappa | B60R 1/27 |
| 11,341,614 | B1 * | 5/2022 | Chen | G06T 7/73 |
| 11,807,169 | B2 * | 11/2023 | Baur | B60R 1/24 |
| 12,139,074 | B2 * | 11/2024 | Johansson | H04N 5/268 |
| 12,399,015 | B2 * | 8/2025 | Bojarski | G01S 19/41 |
| 2011/0115922 | A1 * | 5/2011 | Shimizu | G06T 7/80 348/188 |
| 2013/0286193 | A1 * | 10/2013 | Pflug | B60R 1/27 348/148 |
| 2014/0098229 | A1 * | 4/2014 | Lu | G06T 7/80 348/148 |
| 2014/0320658 | A1 * | 10/2014 | Pliefke | H04N 17/002 348/148 |
| 2014/0333729 | A1 * | 11/2014 | Pflug | G06T 15/50 348/47 |
| 2015/0254825 | A1 * | 9/2015 | Zhang | G06T 3/4038 382/284 |
| 2015/0254853 | A1 * | 9/2015 | Tanaka | H04N 17/002 348/148 |
| 2015/0329048 | A1 * | 11/2015 | Wang | G06T 7/80 348/148 |
| 2016/0275683 | A1 * | 9/2016 | Sakano | H04N 7/181 |
| 2017/0010108 | A1 * | 1/2017 | Shashua | G01C 21/3602 |
| 2017/0061622 | A1 * | 3/2017 | Sakano | G06T 7/80 |
| 2018/0316906 | A1 * | 11/2018 | Nobori | H04N 13/275 |
| 2019/0206084 | A1 * | 7/2019 | Noble | G06V 40/19 |
| 2020/0082568 | A1 * | 3/2020 | Hayakawa | G06T 7/70 |
| 2020/0254876 | A1 * | 8/2020 | Cordell | H04N 7/181 |
| 2021/0035328 | A1 * | 2/2021 | Syed | B60R 1/27 |
| 2021/0243369 | A1 * | 8/2021 | Dal Mutto | G06T 7/80 |
| 2022/0051434 | A1 * | 2/2022 | Suzuki | H04N 23/90 |
| 2023/0169630 | A1 * | 6/2023 | Hassani | G06T 5/50 |
| 2024/0042936 | A1 * | 2/2024 | Germaine | B60R 1/22 |
| 2025/0086920 | A1 * | 3/2025 | Song | G06T 7/33 |
| 2025/0148569 | A1 * | 5/2025 | Herman | G06T 7/90 |

* cited by examiner

KIT DEVICE, CALIBRATION SYSTEM AND OPERATION METHOD THEREOF

CROSS REFERENCE TO RELATED APPLICATIONS

This application claims priority of U.S. Provisional Application No. 63/637,915, filed Apr. 24, 2024, and Taiwan Patent Application No. 113139124, filed on Oct. 15, 2024, the entirety of which is incorporated by reference herein.

BACKGROUND OF THE INVENTION

Field of the Invention

An embodiment of the present invention relates to a kit device, and in particular it relates to a kit device, a calibration system and an operation method thereof.

Description of the Related Art

Generally, in an around view monitor (AVM), a plurality of AVM cameras (for example, there may be four cameras) may be used to capture a plurality of calibration boards that surround the vehicle and use a unified three-dimensional world coordinate axis as a reference, so as to calculate the position and lens angle of the above AVM cameras under the world coordinate and the relative position and lens angle between the above AVM cameras, and then generate a corresponding around-view image. Currently, a driver monitoring camera needs to be added in a vehicle to capture an image of the driver, so as to monitor the attention status and sight of the driver. However, since the traditional type of driver monitoring camera and the AVM do not perform coordinate system calibration, the external parameters of each of the cameras in the same coordinate may not be calibrated, which may be inconvenient in some applications.

For example, in the above situation, it is impossible to accurately know the correlation between the sight of the driver captured by the driver monitoring camera and the object captured by the AVM. Therefore, for example, when a pedestrian laterally bursts into the path of a vehicle, the driver monitoring camera may know the sight direction of the driver, and the AVM may know the position of the pedestrian. However, since the coordinate systems of the two systems have not been accurately calibrated, it is impossible to accurately know whether the driver is looking at the pedestrian. Accordingly, the system may not accurately determine whether to give a gaze prompt or a braking prompt, for example, and there is a certain chance of erroneous operation. Therefore, a new design is needed to solve the problem described above.

BRIEF SUMMARY OF THE INVENTION

An embodiment of the present invention provides a kit device, a calibration system and an operation method thereof, so that different cameras may correlate to the same coordinate system, and the external parameters may be calibrated under the same coordinate system, so as to increase the convenience of use.

An embodiment of the present invention provides a calibration system, which includes a camera group, a second camera, a third camera, a first calibration board, a second calibration board and a processing unit. The camera group includes a first camera, wherein the first camera has a first field of view. The second camera has a second field of view.

The third camera has a third field of view. The third field of view partially overlaps the first field of view and the second field of view. The first calibration board is disposed within the first field of view and the third field of view. The second calibration board is disposed within the second field of view and the third field of view. The processing unit is coupled to the first camera, the second camera and the third camera. The first camera is configured to capture the first calibration board to generate a first image. The second camera is configured to capture the second calibration board to generate a second image. The third camera is configured to capture the first calibration board and the second calibration board to generate a third image. The processing unit is configured to calculate the first relative position and the first angle difference of the first camera and the second camera according to the first image, the second image and the third image.

An embodiment of the present invention provides an operation method of a calibration system, which includes the following steps. A camera group is provided, wherein the camera group comprises a first camera, and the first camera has a first field of view. A second camera having a second field of view is provided. A third camera having a third field of view is provided, wherein the third field of view partially overlaps the first field of view and the second field of view. A first calibration board disposed within the first field of view and the third field of view is provided. A second calibration board disposed within the second field of view and the third field of view is provided. A processing unit coupled to the first camera, the second camera and the third camera is provided. The first camera is used to capture the first calibration board to generate a first image. The second camera is used to capture the second calibration board to generate a second image. The third camera is used to capture the first calibration board and the second calibration board to generate a third image. The processing unit is used to calculate the first relative position and the first angle difference of the first camera and the second camera according to the first image, the second image and the third image.

An embodiment of the present invention provides a kit device suitable to calibrate a first camera and a second camera, wherein the first camera has a first field of view, the second camera has a second field of view. The kit device includes a third camera, a first calibration board, a second calibration board and a processing unit. The third camera has a third field of view, wherein the third field of view partially overlaps the first field of view and the second field of view. The first calibration board is disposed within the first field of view and the third field of view. The second calibration board is disposed within the second field of view and the third field of view. The processing unit is coupled to the first camera, the second camera and the third camera. The processing unit is configured to calculate the first relative position and the first angle difference of the first camera and the second camera according to the first image of the first camera, the second image of the second camera and the third image of the third camera. The first image is generated by the first camera capturing the first calibration board. The second image is generated by the second camera capturing the second calibration board. The third image is generated by the third camera capturing the first calibration board and the second calibration board.

According to the kit device, the calibration system and the operation method thereof disclosed by the embodiment of the present invention, the first calibration board is disposed within the first field of view of the first camera and the third field of view of the third camera. The second calibration board is disposed within the second field of view of the second camera and the third field of view of the third camera. The first camera captures the first calibration board to generate the first image. The second camera captures the second calibration board to generate the second image. The third camera captures the first calibration board and the second calibration board to generate the third image. The processing unit calculates the first relative position and the first angle difference of the first camera and the second camera according to the first image, the second image and the third image. Therefore, different cameras may correlate to the same coordinate system, and the external parameters may be calibrated under the same coordinate system, so as to increase the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1:
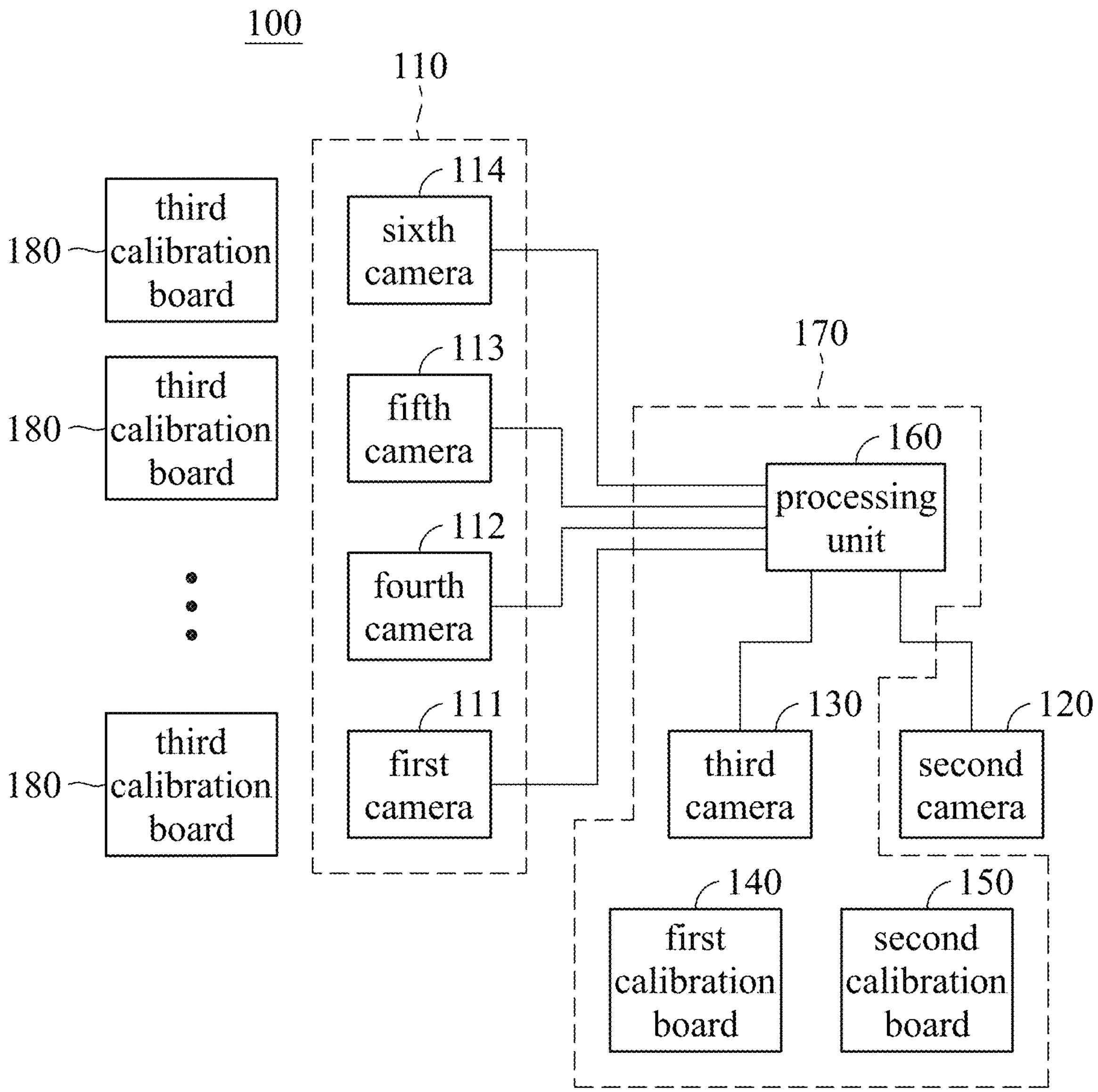
FIG. 1 is a block diagram of a calibration system according to an embodiment of the present invention.
Figure 2:
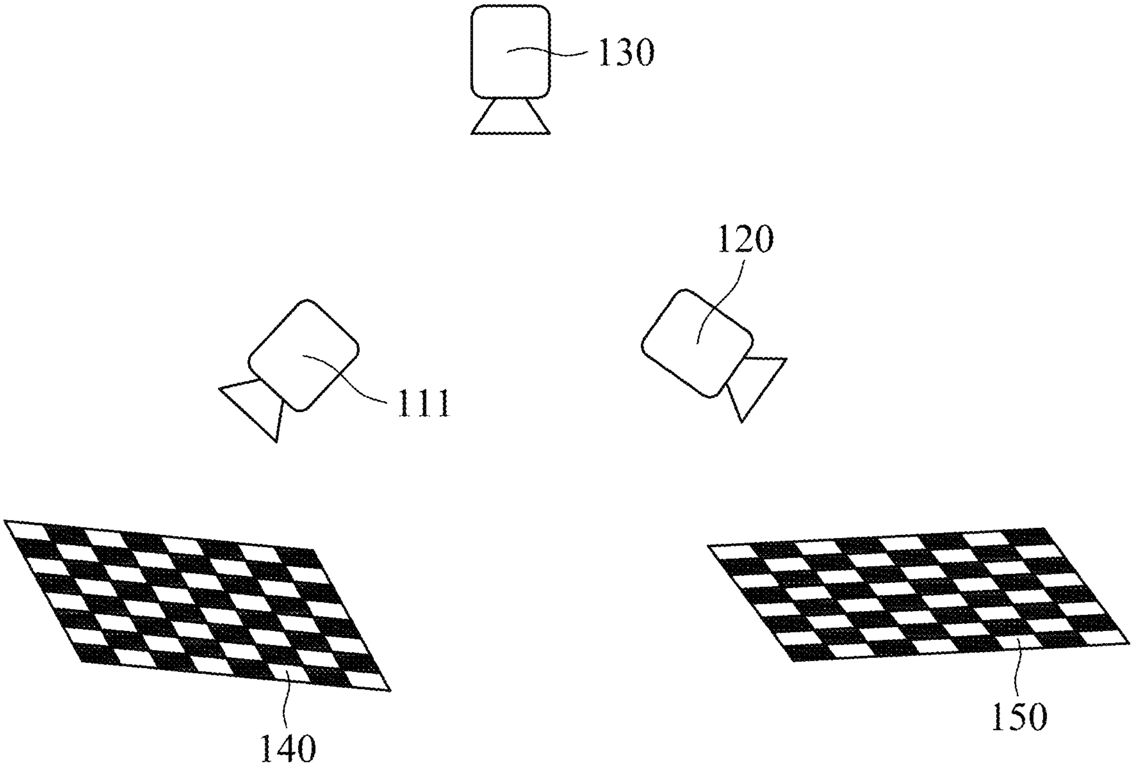
FIG. 2 is a schematic view of a configuration relationship of a first camera, a second camera, a third camera, a first calibration board and a second calibration board according to an embodiment of the present invention.

FIG. 1 is a block diagram of a calibration system according to an embodiment of the present invention. FIG. 2 is a schematic view of a configuration relationship of a first camera, a second camera, a third camera, a first calibration board and a second calibration board according to an embodiment of the present invention. Please refer to FIG. 1. The calibration system 100 may include a control device 110 and a second camera 120. Please refer to FIG. 1 and FIG. 2. The calibration system 100 includes a camera group 110, a second camera 120, a third camera 130, a first calibration board 140, a second calibration board 150 and a processing unit 160. In the embodiment, the third camera 130, the first calibration board 140, the second calibration board 150 and the processing unit 160 may be included in a kit device 170.

The camera group 110 may include a first camera 111. The first camera 111 may have a first field of view. The second camera 120 may have a second field of view. In some embodiments, the first field of view may be different from the second field of view, but the embodiment of the present invention is not limited thereof. That is, the first camera 111 and the second camera 120 may be disposed at different positions, and the first camera 111 and the second camera 120 may capture objects at different positions.

The third camera 130 may have a third field of view, wherein the third field of view partially overlaps the first field of view and the second field of view. That is, the third field of view may partially or completely cover the first field of view, and the third field of view may partially or completely cover the second field of view.

The first calibration board 140 may be disposed within the first field of view and the third field of view. That is, the first calibration board 140 may be disposed within the capturing range of the first camera 111 and the third camera 130. The second calibration board 150 may be disposed within the second field of view and the third field of view. That is, the second calibration board 150 may be disposed within the capturing range of the second camera 120 and the third camera 130.

In some embodiments, each of the first calibration board 140, the second calibration board 150 and the third calibration boards 180 described later may be a calibration board with a checkboard pattern, as shown in FIG. 2, wherein the length of each of the grids on the chessboard is known, so that the actual distance may be measured. However, the embodiment of the present is not limited thereto. In other embodiments, each of the first calibration board 140, the second calibration board 150 and the third calibration boards 180 may be a calibration board with other patterns, which may also achieve the same technical effect, and the shapes of each of the calibration boards may also be the same or different.

The processing unit 160 may be coupled to the first camera 111, the second camera 120 and the third camera 130. In some embodiments, the processing unit 160 may be a central processing unit (CPU), a microprocessor or a micro control unit (MCU), but the embodiment of the present invention is not limited thereto.

The first camera 111 may capture the first calibration board 140 to generate a first image. The second camera 120 may capture the second calibration board 150 to generate a second image. The third camera 130 may capture the first calibration board 140 and the second calibration board 150 to generate a third image. The processing unit 160 may receive the first image, the second image and the third image, and calculate the first relative position and the first angle difference of the first camera 111 and the second camera 120 according to the first image, the second image and the third image.

In some embodiments, the first camera 111 may be one of around view monitor (AVM) cameras, and the second camera 120 may be a driver monitoring system (DMS) camera, such as a near-infrared (NIR) camera, but the embodiment of the present invention is not limited thereto. In addition, the third camera 130 may be a charge-coupled device (CCD)

camera, a near-infrared camera or another suitable camera, but the embodiment of the present invention is not limited thereto. In the embodiment, the second camera 120 is preferably disposed directly in front of the driver, such as behind the steering wheel, so that it may more accurately determine the sight direction of the driver.

In some embodiments, the processing unit 160 may calculate the first position and the first viewing angle corresponding to the first camera 111 and the first calibration board 140 according to the first image. That is, the processing unit 160 may calculate the first position and the first viewing angle corresponding to the first camera 111 and the first calibration board 140 according to the internal parameters of the first camera 111 and the checkboard image of the first calibration board 140 and the actual distance of each of the grids in the first image. Then, the processing unit 160 may calculate the second position and the second viewing angle corresponding to the second camera 120 and the second calibration board 150 according to the second image. That is, the processing unit 160 may calculate the second position and the second viewing angle corresponding to the second camera 120 and the second calibration board 150 according to the internal parameters of the second camera 120 and the checkboard image of the second calibration board 150 and the actual distance of each of the grids in the second image.

Afterward, the processing unit 160 may calculate the third position and the third viewing angle corresponding to the third camera 130 and the first calibration board 140 and the fourth position and the fourth viewing angle corresponding to the third camera 130 and the second calibration board 150 according to the third image. That is, the processing unit 160 may calculate the third position and the third viewing angle corresponding to the third camera 130 and the first calibration board 140 according to the internal parameters of the third camera 130 and the checkboard image of the first calibration board 140 and the actual distance of each of the grids in the third image; and calculate the fourth position and the fourth viewing angle corresponding to the third camera 130 and the second calibration board 150 according to the internal parameters of the third camera 130 and the checkboard image of the second calibration board 150 and the actual distance of each of the grids in the third image. Then, the processing unit 160 may calculate the first relative position and the first angle difference of the first camera 111 and the second camera 120 according to the first position, the first viewing angle, the second position, the second viewing angle, the third position, the third viewing angle, the fourth position and the fourth viewing angle. In the embodiment, the first relative position and the first angle difference of the first camera 111 and the second camera 120 may be calculated by the following equation (1).

$$ {}^{cameraAVM}T_{cameraDMS} = {}^{cameraAVM}T_{aux.chessboard1} * {}^{cameraAuxially}T^{-1}_{aux.chessboard1} * {}^{camerAuxially}T_{aux.chessboard2} * {}^{cameraDMS}T^{-1}_{aux.chessboard2} \quad (1) $$

wherein ${}^{cameraAVM}T_{cameraDMS}$ is a matrix of the first relative position and the first angle difference of the first camera 111 and the second camera 120 (i.e., a rotation and translation matrix that converts the camera coordinate point of the second camera 120 to the camera coordinate point of the first camera 111), ${}^{cameraAVM}T_{aux.chessboard1}$ is a matrix of the first position and the first viewing angle corresponding to the first camera 111 and the first calibration board 140, ${}^{cameraDMS}T_{aux.chessboard2}$ is a matrix of the second position and the second viewing angle corresponding to the second camera 120 and the second calibration board 150, ${}^{cameraAuxially}T_{aux.chessboard1}$ is a matrix of the third position and the third viewing angle corresponding to the third camera 130 and the first calibration board 140, ${}^{cameraAuxially}T_{aux.chessboard2}$ is a matrix of the fourth position and the fourth viewing angle corresponding to the third camera 130 and the second calibration board 150.

In some embodiments, the first camera 111 may correlate to a three-dimensional coordinate system. Furthermore, in some embodiments, the processing unit 160 may correlate the second camera 120 to the three-dimensional coordinate system according to the first relative position and the first angle difference of the first camera 111 and the second camera 120, and to calculate the position and the viewing angle of the second camera 120 under the three-dimensional coordinate system. Therefore, the second camera 120 and the first camera 111 may correlate to the same coordinate system and calibrate the external parameters under the same coordinate system, so that the object position and the image captured by the second camera 120 may be integrated into the coordinate system of the image (such as the panoramic image) captured by the first camera 111, so as to increase the convenience of use.

In some embodiments, the camera group 110 further includes a fourth camera 112, a fifth camera 113 and a sixth camera 114. The fourth camera 112, the fifth camera 113 and sixth camera 114 may be coupled to the processing unit 160. The fourth camera 112 may have a fourth field of view. The fifth camera 113 may have a fifth field of view. The sixth camera 114 have a sixth field of view. In addition, the calibration system 100 may further include a plurality of third calibration boards 180, and these third calibration boards 180 may be respectively disposed within the first field of view, the fourth field of view, the fifth field of view, and the sixth field of view.

Figure 3:
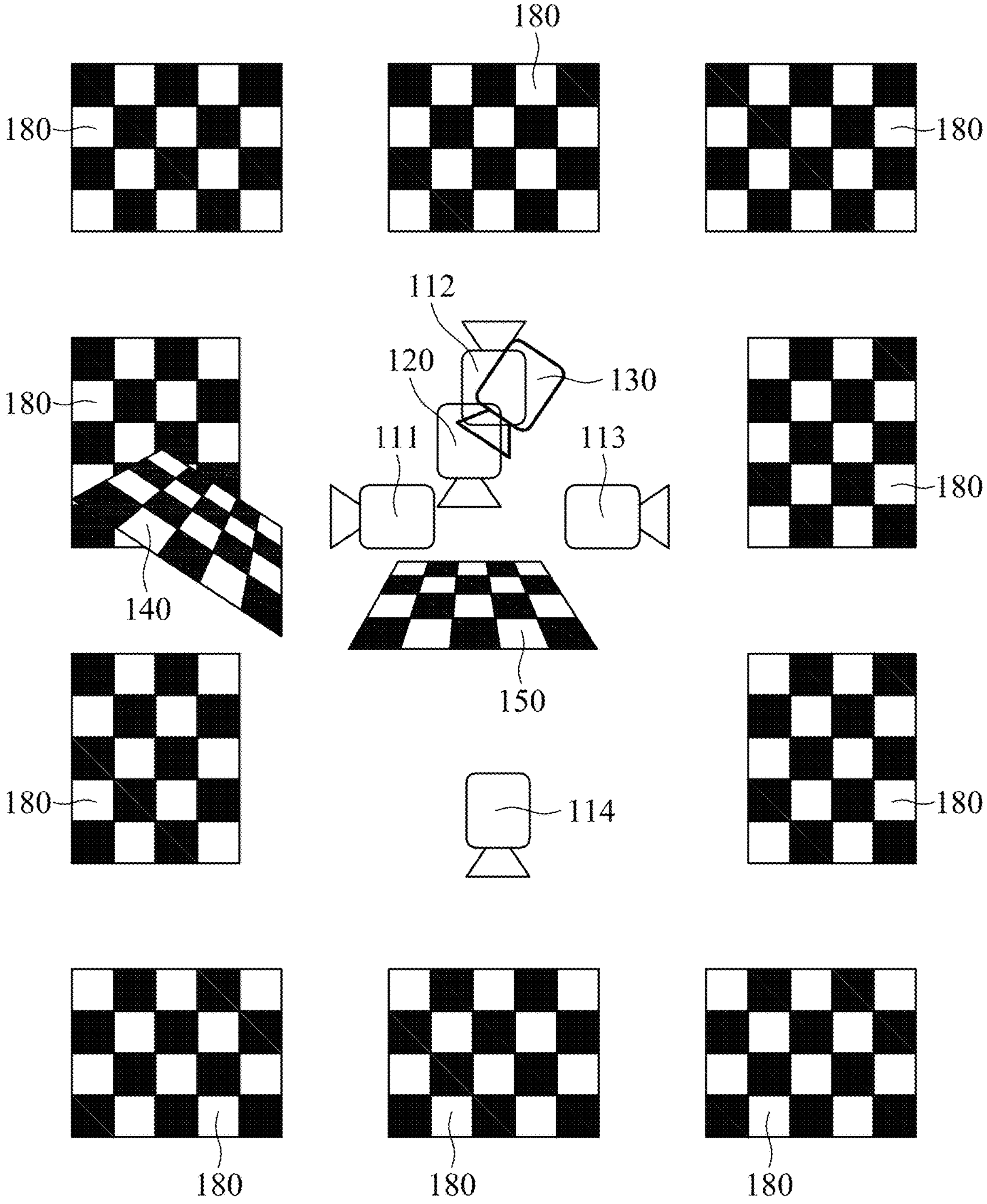
FIG. 3 is a schematic view of a configuration relationship of a first camera, a second camera, a third camera, a fourth camera, a fifth camera, a sixth camera, a first calibration board, a second calibration board and a plurality of third camera according to an embodiment of the present invention.

In some embodiments, as shown in FIG. 3, the first camera 111 may be disposed in a vehicle, may be adjacent to the left side of the vehicle and may face outside of the vehicle, such as in the left rearview mirror. The second camera 120 may be disposed in the vehicle, may be adjacent to the windshield in the vehicle and may face the driver. The third camera 130 may be disposed in the vehicle, may be adjacent to the front of the vehicle and may face the left side of the vehicle body and the driver.

The fourth camera 112 may be disposed in a vehicle body, may be adjacent to the front of the vehicle and may face outside of the vehicle. The fifth camera 113 may be disposed in the vehicle, may be adjacent to the right side of the vehicle and may face outside of the vehicle, such as in the right rearview mirror. The sixth camera 114 may be disposed in the vehicle, may be adjacent to rear of the vehicle body and may face outside of the vehicle body.

The first calibration board 140 may, for example, be disposed outside the vehicle, and may be located within the first field of view of the first camera 111 and the third field of view of the third camera 130. The second calibration board 150 may, for example, disposed within the vehicle, and may be located within the second field of view of the second camera 120 and the third field of view of the third camera 130.

The following describes a method of establishing a three-dimensional coordinate system. However, the present invention is not limited thereto, and other methods may also be used to establish the three-dimensional coordinate system. Specifically, in order to facilitate the calibration of the position and the viewing angle of the camera group 110 in the three-dimensional coordinate system, the third calibration boards 180 may be disposed outside the vehicle body and around the vehicle body, wherein the chessboard size of each of the third calibration boards is the same. Particularly, each of the third calibration boards 180 is at least located within one of the first field of view of the first camera 111, the fourth field of view of the fourth camera 112, the fifth field of view of the fifth camera 113 and the sixth field of view of the sixth camera 114.

The first camera 111 may capture the third calibration boards 180 disposed within the first field of view to generate a fourth image. The fourth camera 112 may capture the third calibration boards 180 disposed within the fourth field of view to generate a fifth image. The fifth camera 113 may capture the third calibration boards 180 disposed within the fifth field of view to generate a sixth image. The sixth camera 114 may capture the third calibration boards 180 disposed within the sixth field of view to generate a seventh image.

The processing unit 160 may receive the fourth image, the fifth image, the sixth image and the seventh image, and calculate second relative positions and second angle differences of the first camera 111, the fourth camera 112, the fifth camera 113 and the sixth camera 114 according to the fourth image, the fifth image, the sixth image and the seventh image.

In some embodiments, the processing unit 160 may further correlate the first camera 111, the fourth camera 112, the fifth camera 113 and the sixth camera 114 to the three-dimensional coordinate system according to the second relative positions and the second angle differences of the first camera 111, the fourth camera 112, the fifth camera 113 and the sixth camera 114 and three-dimensional point coordinate information, and calculate the positions and the viewing angles of the first camera 111, the fourth camera 112, the fifth camera 113 and the sixth camera 114 under the three-dimensional coordinate system. Then, the processing unit 160 may process the images generated by the first camera 111, the fourth camera 112, the fifth camera 113 and the sixth camera 114 according to the positions and the viewing angles of the first camera 111, the fourth camera 112, the fifth camera 113 and the sixth camera 114 under the three-dimensional coordinate system, so as to form a panoramic image. In addition, since the processing unit 160 correlates the second camera 120 and the first camera 111 to the same coordinate system and calibrates the external parameters under the same coordinate system, the processing unit 160 may integrate the image captured by the second camera 120 into the panoramic image formed by the first camera 111, the four camera 112, the fifth camera 113 and the camera 114, so as to increase the convenience of use.

In some embodiments, the first field of view, the fourth field of view, the fifth field of view and the sixth field of view are different and partially overlap. In some embodiments, each of the first camera, the fourth camera 111, the fourth camera 112, the fifth camera 113 and the sixth camera 114 is an around view monitor camera, and the second camera 120 is a driver monitoring system camera.

In the foregoing embodiment, the calibration system 100 takes the first camera 111 of the camera group 110 and the second camera 120 as an example, and calculates the first relative position and the first angle difference of the first camera 111 and the second camera 120, and then calculate the position and the viewing angle of the second camera 120 under the three-dimensional coordinate system corresponding to the first camera 111, but the embodiment of the present invention is not limited thereto. In other embodiments, since the first camera 111, the fourth camera 112, the fifth camera 113 and the sixth camera 114 may correlate to the same three-dimensional coordinate system, the calibration system 100 may use the fourth camera 112, the fifth camera 113 of the sixth camera 114 to replace the first camera 111, and calculate the first relative position and the first angle difference of the fourth camera 112, the fifth camera 113 or the sixth camera 114 and the second camera 120, and then calculate the position and the viewing angle of the second camera 120 under the three-dimensional coordinate system corresponding the fourth camera 112, the fifth camera 113 or the camera 114. In addition, the manner of calculating the first relative position and the first angle difference of the fourth camera 112, the fifth camera 113 or the sixth camera 114 and the second camera 120 may refer to the description of calculating the first relative position and the first angle difference of the first camera 111 and the second camera 120, and the description is not repeated herein.

Figure 4:
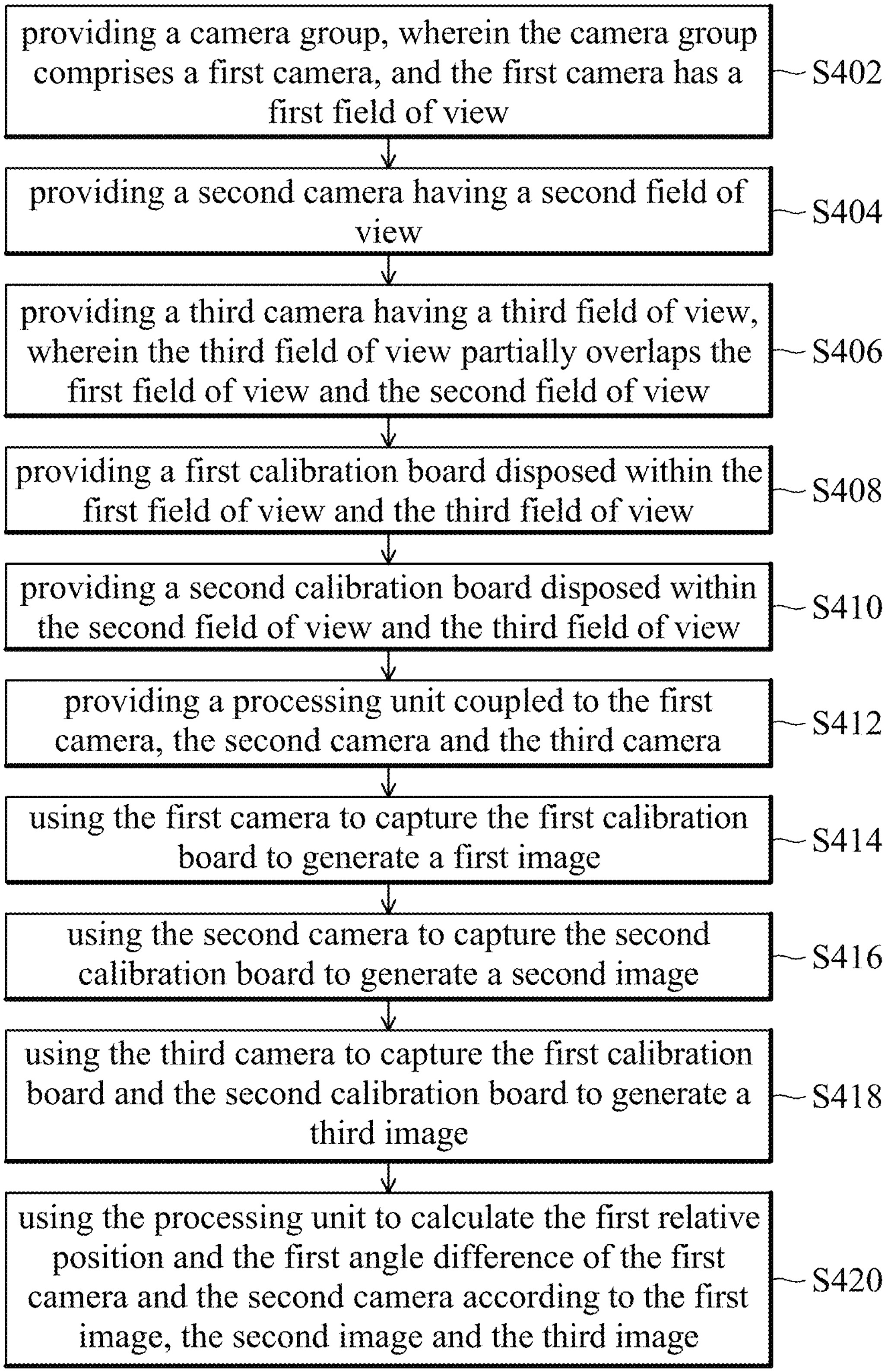
FIG. 4 is a flowchart of an operation method of a calibration system according to an embodiment of the present invention.

FIG. 4 is a flowchart of an operation method of a calibration system according to an embodiment of the present invention. In step S402, the method involves providing a camera group, wherein the camera group comprises a first camera, and the first camera has a first field of view. In step S404, the method involves providing a second camera having a second field of view.

In step S406, the method involves providing a third camera having a third field of view, wherein the third field of view partially overlaps the first field of view and the second field of view. In step S408, the method involves providing a first calibration board disposed within the first field of view and the third field of view. In step S410, the method involves providing a second calibration board disposed within the second field of view and the third field of view.

In step S412, the method involves providing a processing unit coupled to the first camera, the second camera and the third camera. In step S414, the method involves using the first camera to capture the first calibration board to generate a first image. In step S416, the method involves using the second camera to capture the second calibration board to generate a second image. In step S418, the method involves using the third camera to capture the first calibration board and the second calibration board to generate a third image. In step S420, the method involves using the processing unit to calculate the first relative position and the first angle difference of the first camera and the second camera according to the first image, the second image and the third image. In some embodiments, the first field of view is, for example, different from the second field of view. In some embodiments, the first camera is, for example, an around view monitor camera, and the second camera is, for example, a driver monitoring system camera.

Figure 5:
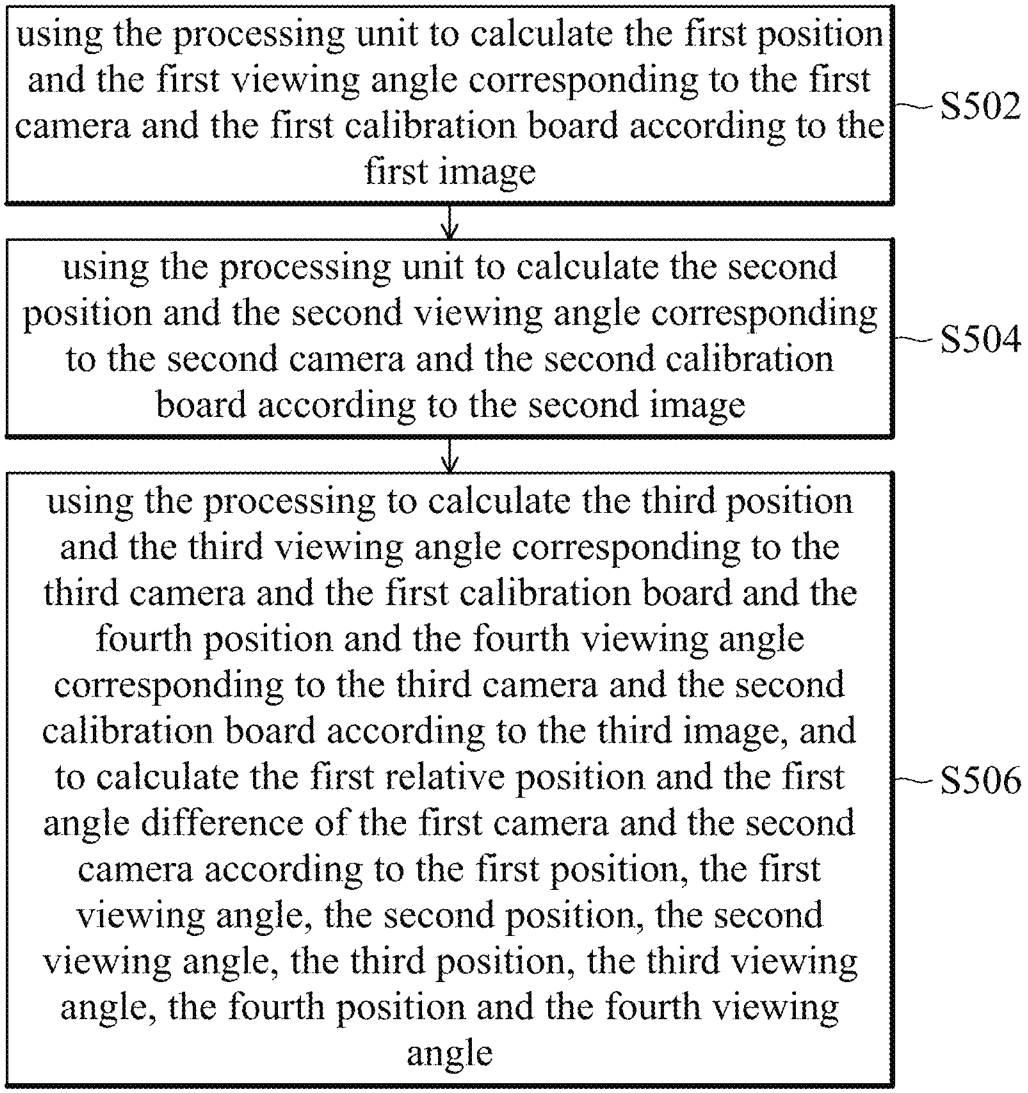
FIG. 5 is a detailed flowchart of step S420 in FIG. 4.

FIG. 5 is a detailed flowchart of step S420 in FIG. 4. In step S502, the method involves using the processing unit to calculate the first position and the first viewing angle corresponding to the first camera and the first calibration board according to the first image. In step S504, the method involves using the processing unit to calculate the second position and the second viewing angle corresponding to the second camera and the second calibration board according to the second image. In step S506, the method involves using the processing to calculate the third position and the third viewing angle corresponding to the third camera and the first calibration board and the fourth position and the fourth viewing angle corresponding to the third camera and the second calibration board according to the third image, and to calculate the first relative position and the first angle difference of the first camera and the second camera according to the first position, the first viewing angle, the second position, the second viewing angle, the third position, the third viewing angle, the fourth position and the fourth viewing angle. In some embodiments, the first camera correlates to, for example, a three-dimensional coordinate system.

Figure 6:
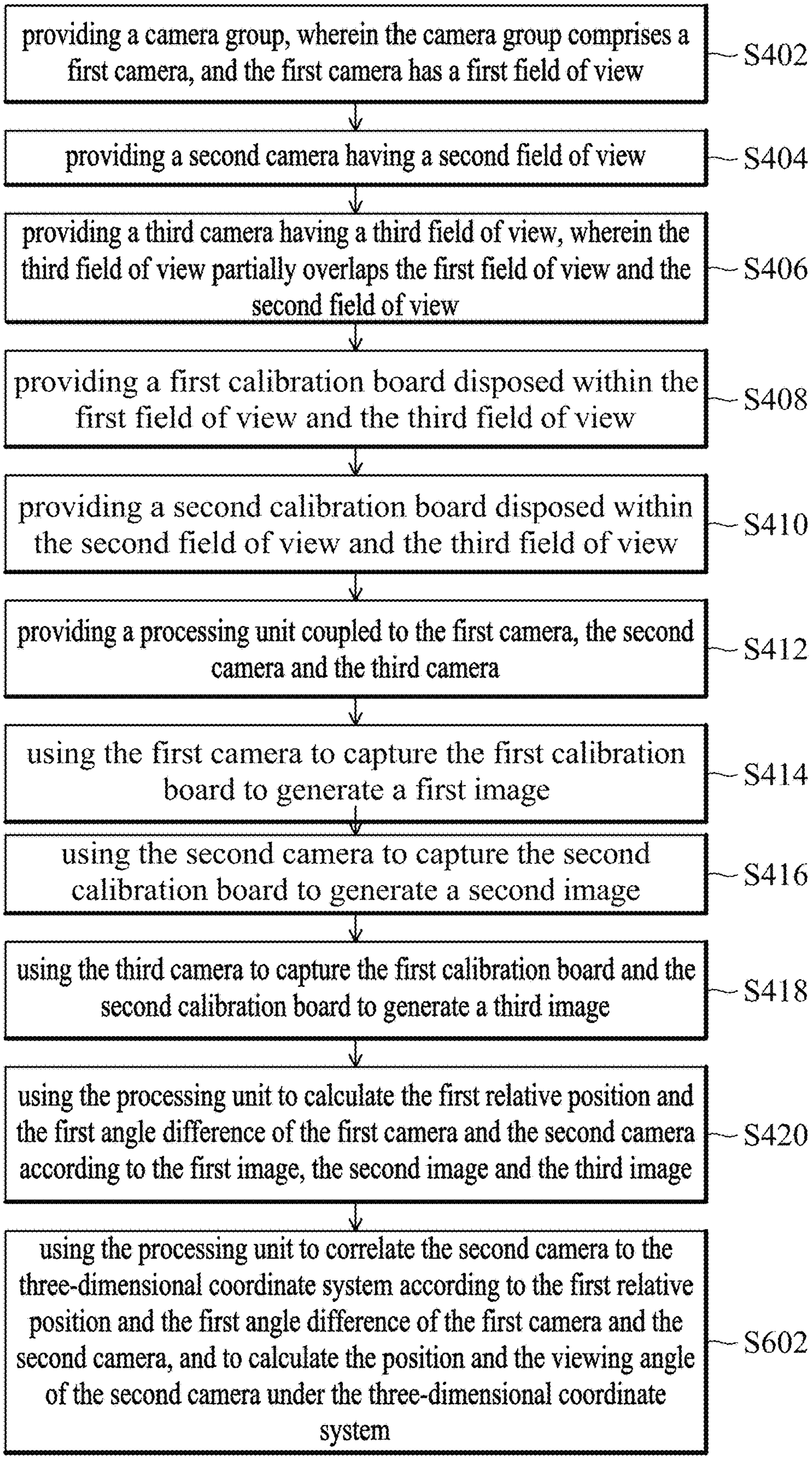
FIG. 6 is a flowchart of an operation method of a calibration system according to another embodiment of the present invention.

FIG. 6 is a flowchart of an operation method of a calibration system according to another embodiment of the present invention. In the embodiment, steps S402~S420 in FIG. 6 are the same as or similar to steps S402~420 in FIG. 4. Accordingly, steps S402~420 in FIG. 6 may refer to the description of the embodiment of FIG. 4, and the description thereof is not repeated herein. In step S602, the method involves using the processing unit to correlate the second camera to the three-dimensional coordinate system according to the first relative position and the first angle difference of the first camera and the second camera, and to calculate the position and the viewing angle of the second camera under the three-dimensional coordinate system.

Figure 7A:
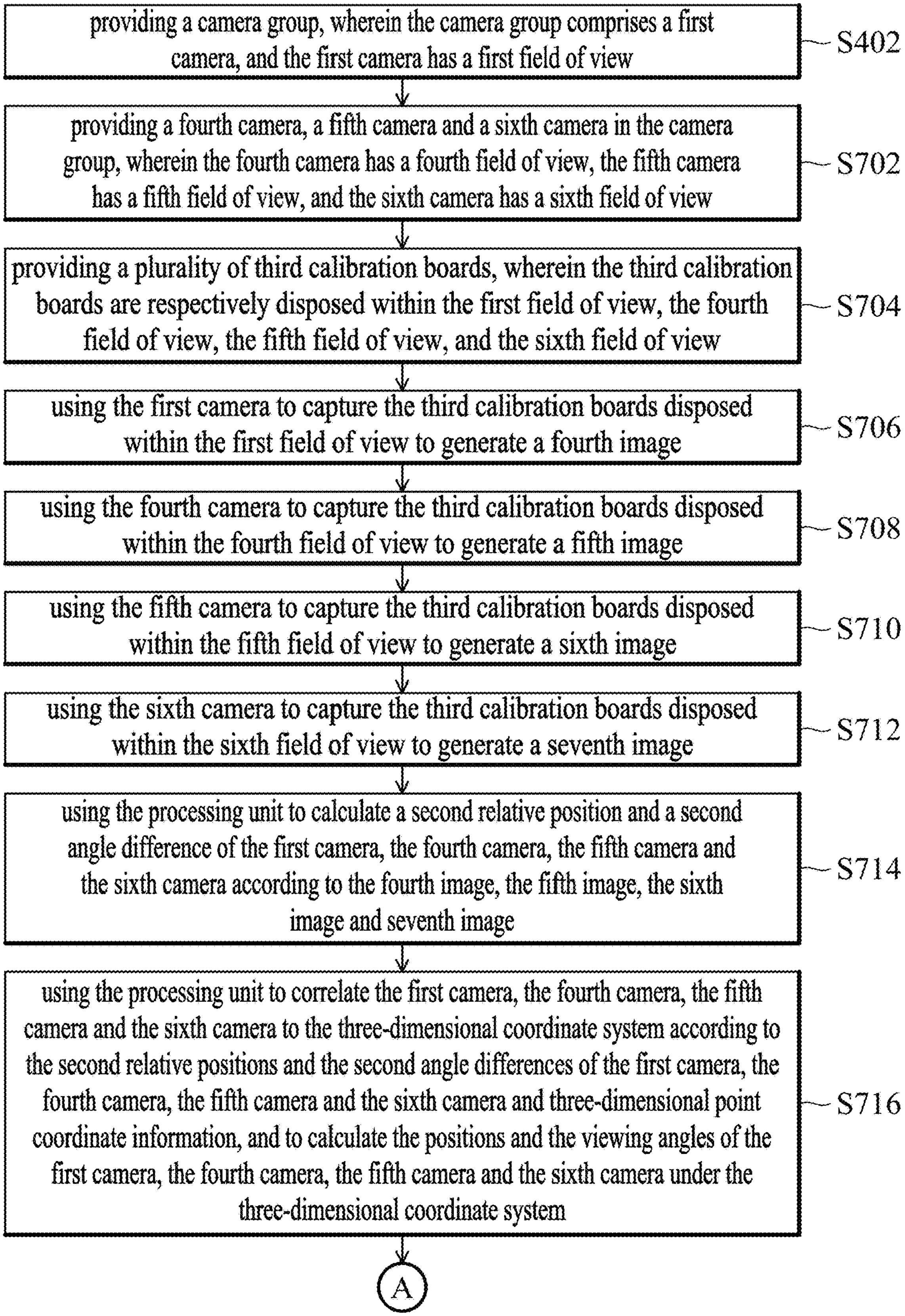
FIG. 7A and FIG. 7B are a flowchart of an operation method of a calibration system according to another embodiment of the present invention.
Figure 7B:
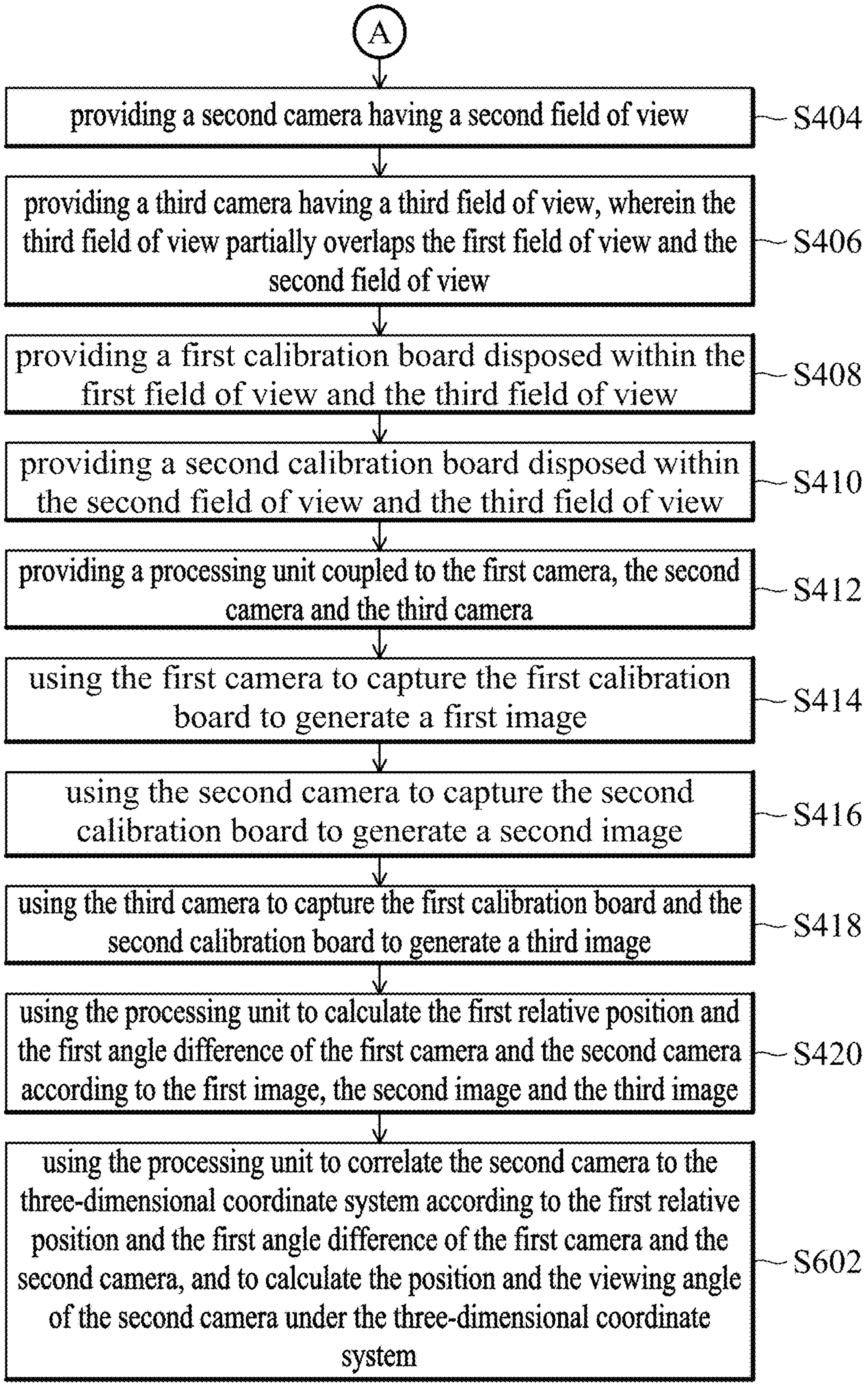

FIG. 7A and FIG. 7B are a flowchart of an operation method of a calibration system according to another embodiment of the present invention. In the embodiment, steps S402~S420 and S602 in FIG. 7A and FIG. 7B are the same as or similar to steps S402~420 and S602 in FIG. 6. Accordingly, steps S402~S420 and S602 in FIG. 7A and FIG. 7B may refer to the description of the embodiment of FIG. 6, and the description thereof is not repeated herein. In step S702, the method involves providing a fourth camera, a fifth camera and a sixth camera in the camera group, wherein the fourth camera has a fourth field of view, the fifth camera has a fifth field of view, and the sixth camera has a sixth field of view.

In step S704, the method involves providing a plurality of third calibration boards, wherein the third calibration boards are respectively disposed within the first field of view, the fourth field of view, the fifth field of view, and the sixth field of view. In step S706, the method involves using the first camera to capture the third calibration boards disposed within the first field of view to generate a fourth image. In step S708, the method involves using the fourth camera to capture the third calibration boards disposed within the fourth field of view to generate a fifth image. In step S710, the method involves using the fifth camera to capture the third calibration boards disposed within the fifth field of view to generate a sixth image.

In step S712, the method involves using the sixth camera to capture the third calibration boards disposed within the sixth field of view to generate a seventh image. In step S714, the method involves using the processing unit to calculate second relative positions and second angle differences of the first camera, the fourth camera, the fifth camera and the sixth camera according to the fourth image, the fifth image, the sixth image and seventh image.

In step S716, the method involves using the processing unit to correlate the first camera, the fourth camera, the fifth camera and the sixth camera to the three-dimensional coordinate system according to the second relative positions and the second angle differences of the first camera, the fourth camera, the fifth camera and the sixth camera and three-dimensional point coordinate information, and to calculate the positions and the viewing angles of the first camera, the fourth camera, the fifth camera and the sixth camera under the three-dimensional coordinate system.

In some embodiments, the first field of view, the fourth field of view, the fifth field of view and the sixth field of view are, for example, different and partially overlap. In some embodiments, each of the first camera, the fourth camera, the fifth camera and the sixth camera is, for example, an around view monitor camera, and the second camera is, for example, a driver monitoring system camera.

It should be noted that the order of the steps of FIG. 4, FIG. 5, FIG. 6, FIG. 7A and FIG. 7B is only for illustrative purposes, and is not intended to limit the order of the steps of the present invention. The user may change the order of the steps above to meet specific requirements. The flowcharts described above may add additional steps or use fewer steps without departing from the spirit and scope of the present invention.

In summary, according to the kit device, the calibration system and the operation method thereof disclosed by the embodiment of the present invention, the first calibration board is disposed within the first field of view of the first camera and the third field of view of the third camera. The second calibration board is disposed within the second field of view of the second camera and the third field of view of the third camera. The first camera captures the first calibration board to generate the first image. The second camera captures the second calibration board to generate the second image. The third camera captures the first calibration board and the second calibration board to generate the third image. The processing unit calculates the first relative position and the first angle difference of the first camera and the second camera according to the first image, the second image and the third image. Therefore, different cameras may correlate to the same coordinate system, and the external parameters may be calibrated under the same coordinate system, so as to increase the convenience of use.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A calibration system, comprising:

a camera group, comprising a first camera, wherein the first camera has a first field of view, wherein the first camera is one of around view monitor cameras;

a second camera, having a second field of view, wherein the second camera is a driver monitoring system camera;

a third camera, having a third field of view, wherein the third field of view partially overlaps the first field of view and the second field of view, wherein the third camera is another one of around view monitor cameras;

a first calibration board, disposed within the first field of view and the third field of view;

a second calibration board, disposed within the second field of view and the third field of view;

a processing unit, coupled to the first camera, the second camera and the third camera;

wherein the first camera is configured to capture the first calibration board to generate a first image;

wherein the second camera is configured to capture the second calibration board to generate a second image;

wherein the third camera is configured to capture the first calibration board and the second calibration board to generate a third image;

wherein the processing unit is configured to calculate a first relative position and a first angle difference of the first camera and the second camera according to the first image, the second image and the third image;

wherein the processing unit is further configured to calculate a first position and a first viewing angle corresponding to the first camera and the first calibration board according to the first image;

wherein the processing unit is further configured to calculate a second position and a second viewing angle corresponding to the second camera and the second calibration board according to the second image;

wherein the processing unit is further configured to calculate a third position and a third viewing angle corresponding to the third camera and the first calibration board and a fourth position and a fourth viewing angle corresponding to the third camera and the second calibration board according to the third image, and the processing unit is configured to calculate the first relative position and the first angle difference of the first camera and the second camera according to the first position, the first viewing angle, the second position, the second viewing angle, the third position, the third viewing angle, the fourth position and the fourth viewing angle.

2. The calibration system as claimed in claim 1, wherein the first field of view is different from the second field of view.

3. The calibration system as claimed in claim 1, wherein the first camera correlates to a three-dimensional coordinate system.

4. The calibration system as claimed in claim 3, wherein the processing unit is further configured to correlate the second camera to the three-dimensional coordinate system according to the first relative position and the first angle difference of the first camera and the second camera, and to calculate a position and a viewing angle of the second camera under the three-dimensional coordinate system.

5. The calibration system as claimed in claim 3, wherein the camera group further comprises a fourth camera, a fifth camera and a sixth camera, the fourth camera has a fourth field of view, the fifth camera has a fifth field of view, and the sixth camera has a sixth field of view, wherein each of fourth camera, a fifth camera and a sixth camera is another one of around view monitor cameras;

wherein the calibration system further comprises a plurality of third calibration boards, and the plurality of third calibration boards are respectively disposed within the first field of view, the fourth field of view, the fifth field of view, and the sixth field of view;

wherein the first camera is configured to capture the third calibration boards disposed within the first field of view to generate a fourth image;

wherein the fourth camera is configured to capture the third calibration boards disposed within the fourth field of view to generate a fifth image;

wherein the fifth camera is configured to capture the third calibration boards disposed within the fifth field of view to generate a sixth image;

wherein the sixth camera is configured to capture the third calibration boards disposed within the sixth field of view to generate a seventh image;

wherein the processing unit is configured to calculate second relative positions and second angle differences of the first camera, the fourth camera, the fifth camera and the sixth camera according to the fourth image, the fifth image, the sixth image and the seventh image.

6. The calibration system claimed in claim 5, wherein the processing unit is further configured to correlate the first camera, the fourth camera, the fifth camera and the sixth camera to the three-dimensional coordinate system according to the second relative positions and the second angle differences of the first camera, the fourth camera, the fifth camera and the sixth camera and three-dimensional point coordinate information, and to calculate positions and viewing angles of the first camera, the fourth camera, the fifth camera and the sixth camera under the three-dimensional coordinate system.

7. The calibration system as claimed in claim 5, wherein the first field of view, the fourth field of view, the fifth field of view and the sixth field of view are different and partially overlap.

8. An operation method of a calibration system, comprising:

providing a camera group, wherein the camera group comprises a first camera, and the first camera has a first field of view, wherein the first camera is one of around view monitor cameras;

providing a second camera having a second field of view, wherein the second camera is a driver monitoring system camera;

providing a third camera having a third field of view, wherein the third field of view partially overlaps the first field of view and the second field of view, wherein the third camera is another one of around view monitor cameras;

providing a first calibration board disposed within the first field of view and the third field of view;

providing a second calibration board disposed within the second field of view and the third field of view;

providing a processing unit coupled to the first camera, the second camera and the third camera;

using the first camera to capture the first calibration board to generate a first image;

using the second camera to capture the second calibration board to generate a second image;

using the third camera to capture the first calibration board and the second calibration board to generate a third image;

using the processing unit to calculate a first relative position and a first angle difference of the first camera and the second camera according to the first image, the second image and the third image;

wherein the step of using the processing unit to calculate the first relative position and the first angle difference of the first camera and the second camera according to the first image, the second image and the third image comprises:

using the processing unit to calculate a first position and a first viewing angle corresponding to the first camera and the first calibration board according to the first image;

using the processing unit to calculate a second position and a second viewing angle corresponding to the second camera and the second calibration board according to the second image;

using the processing to calculate a third position and a third viewing angle corresponding to the third camera and the first calibration board and a fourth position and a fourth viewing angle corresponding to the third camera and the second calibration board according to the third image, and to calculate the first relative position and the first angle difference of the first camera and the second camera according to the first position, the first viewing angle, the second position, the second viewing angle, the third position, the third viewing angle, the fourth position and the fourth viewing angle.

9. The operation method of the calibration system as claimed in claim 8, wherein the first field of view is different from the second field of view.

10. The operation method of the calibration system as claimed in claim 8, wherein the first camera correlates to a three-dimensional coordinate system.

11. The operation method of the calibration system as claimed in claim 10, further comprising:

using the processing unit to correlate the second camera to the three-dimensional coordinate system according to the first relative position and the first angle difference of the first camera and the second camera, and to calculate a position and a viewing angle of the second camera under the three-dimensional coordinate system.

12. The operation method of the calibration system as claimed in claim 10, further comprising:

providing a fourth camera, a fifth camera and a sixth camera in the camera group, wherein the fourth camera has a fourth field of view, the fifth camera has a fifth field of view, and the sixth camera has a sixth field of view, wherein each of fourth camera, a fifth camera and a sixth camera is another one of around view monitor cameras;

providing a plurality of third calibration boards, wherein the plurality of third calibration boards are respectively disposed within the first field of view, the fourth field of view, the fifth field of view, and the sixth field of view;

using the first camera to capture the third calibration boards disposed within the first field of view to generate a fourth image;

using the fourth camera to capture the third calibration boards disposed within the fourth field of view to generate a fifth image;

using the fifth camera to capture the third calibration boards disposed within the fifth field of view to generate a sixth image;

using the sixth camera to capture the third calibration boards disposed within the sixth field of view to generate a seventh image;

using the processing unit to calculate second relative positions and second angle differences of the first camera, the fourth camera, the fifth camera and the sixth camera according to the fourth image, the fifth image, the sixth image and the seventh image.

13. The operation method of the calibration system as claimed in claim 12, further comprising:

using the processing unit to correspond the first camera, the fourth camera, the fifth camera and the sixth camera to the three-dimensional coordinate system according to the second relative positions and the second angle differences of the first camera, the fourth camera, the fifth camera and the sixth camera and three-dimensional point coordinate information, and to calculate positions and viewing angles of the first camera, the fourth camera, the fifth camera and the sixth camera under the three-dimensional coordinate system.

14. The operation method of the calibration system as claimed in claim 12, wherein the first field of view, the fourth field of view, the fifth field of view and the sixth field of view are different and partially overlap.

15. A kit device, suitable to calibrate a first camera and a second camera, wherein the first camera has a first field of view, the second camera has a second field of view, the first camera is one of around view monitor cameras, the second camera is a driver monitoring system camera, and the kit device comprises:

a third camera, having a third field of view, wherein the third field of view partially overlaps the first field of view and the second field of view, wherein the third camera is another one of around view monitor cameras;

a first calibration board, disposed within the first field of view and the third field of view;

a second calibration board, disposed within the second field of view and the third field of view;

a processing unit, coupled to the first camera, the second camera and the third camera;

wherein the processing unit is configured to calculate a first relative position and a first angle difference of the first camera and the second camera according to a first image of the first camera, a second image of the second camera and a third image of the third camera;

wherein the first image is generated by the first camera capturing the first calibration board;

wherein the second image is generated by the second camera capturing the second calibration board;

wherein the third image is generated by the third camera capturing the first calibration board and the second calibration board;

wherein the processing unit is further configured to calculate a first position and a first viewing angle corresponding to the first camera and the first calibration board according to the first image;

wherein the processing unit is further configured to calculate a second position and a second viewing angle corresponding to the second camera and the second calibration board according to the second image;

wherein the processing unit is further configured to calculate a third position and a third viewing angle corresponding to the third camera and the first calibration board and a fourth position and a fourth viewing angle corresponding to the third camera and the second calibration board according to the third image, and the processing unit is configured to calculate the first relative position and the first angle difference of the first camera and the second camera according to the first position, the first viewing angle, the second position, the second viewing angle, the third position, the third viewing angle, the fourth position and the fourth viewing angle.

* * * * *